United States Patent [19]

Umeya et al.

[11] 4,096,098

[45] Jun. 20, 1978

[54] SEMICONDUCTOR CERAMIC COMPOSITION

[75] Inventors: Kazumasa Umeya; Kazunari Yonezuka, both of Tokyo, Japan

[73] Assignee: TDK Electronics Co., Ltd., Tokyo, Japan

[21] Appl. No.: 632,840

[22] Filed: Nov. 17, 1975

[30] Foreign Application Priority Data

Aug. 8, 1975 Japan ................................. 50-96537

[51] Int. Cl.$^2$ .............................................. H01B 1/06
[52] U.S. Cl. .................................. 252/520; 106/73.2; 106/73.31; 106/73.5; 252/62.3 BT; 252/518; 252/521
[58] Field of Search ................ 252/623 BT, 518, 520, 252/521; 106/73.5, 73.31, 73.2

[56] References Cited

U.S. PATENT DOCUMENTS

| | | | |
|---|---|---|---|
| 2,976,505 | 3/1961 | Ichikawa | 252/520 X |
| 3,586,642 | 6/1971 | Matsuo et al. | 252/520 |
| 3,764,529 | 10/1973 | Matsuo et al. | 252/62.3 BT X |
| 4,014,822 | 3/1977 | Fujikawa | 252/520 |

FOREIGN PATENT DOCUMENTS

| | | | |
|---|---|---|---|
| 45-27,944 | 9/1970 | Japan | 252/62.3 BT |
| 47-27,712 | 7/1972 | Japan | 252/62.3 BT |
| 47-41,153 | 10/1972 | Japan | 252/62.3 BT |

OTHER PUBLICATIONS

Nakhudnova et al., "Chem. Abstracts", vol. 69, 1968, 31235j.
Ikeda, "Chem. Abstracts", vol. 52, 1958, p. 19380g.
McQuarrie, "J. of the Amer. Ceram. Soc.", vol. 40, No. 2, 1957.

*Primary Examiner*—Jack Copper
*Attorney, Agent, or Firm*—Oblon, Fisher, Spivak, McClelland & Maier

[57] ABSTRACT

A semiconductor ceramic composition having positive temperature characteristics which comprises titanates of barium, lead and calcium which have 1 – 40 mole % of lead titanate and 1 – 22 mole % of calcium titanate and 38 – 98 mole % of barium titanate and 0.03 – 0.6 mole % of a semiconductor-forming component based on said titanates.

7 Claims, 2 Drawing Figures

SEMICONDUCTOR CERAMIC COMPOSITION

BACKGROUND OF THE INVENTION

1. Field of the Invention

The present invention relates to a semiconductor ceramic composition having positive temperature characteristics and which can withstand remarkably high voltages.

2. Description of the Prior Art

In general, it is known that if ceramic compositions could be prepared having various temperatures Tc (temperature for resulting positive characteristic) and various temperature coefficients for resistance, the fields of use for ceramic compositions would be enlarged. Accordingly, it has been proposed to substitute strontium for a part of the barium of a barium titanate-type semiconductor, or to substitute tin for part of the titanium so as to decrease a Curie point (temperature for resulting positive temperature characteristics) of the barium titanate which is 120° C. It has been proposed in German Pat. No. 929,350 to substitute lead for part of the barium so as to increase the temperature for initiating the resistance increase to higher than 120° C. It has been proposed in Japanese Patent Publication No. 17784/1964 to substitute strontium and calcium for part of the barium in barium titanate-type semiconductors so as to decrease the Curie point, whereby the Curie point (temperature for resulting positive temperature characteristics) is about room temperature and the variation of resistance caused by variation of voltage is decreased.

Recently, there have been remarkable improvements in the utilization of barium titanate-type semiconductor ceramic compositions as heating elements. It was necessary to increase the Curie point which was about 120° C. In order to achieve the necessary increase, it has been proposed to form a solid solution of barium titanate and lead titanate which is prepared by substituting lead for part of the barium in barium titanate. In this manner it has been possible to increase the Curie point, however, the vaporization of lead during the sintering of the ceramics is great enough to cause disadvantages, in particular, it has been difficult to obtain ceramics having high densities and high strengths. The ceramics prepared have inferior electrical characteristics such as high voltage dependency, relatively low breakdown voltages and low reliability when used as heating elements. Moreover, the ceramics exhibit poor ageing variation under load at high temperature and have low durability which limits the utility of these ceramics when used as heating elements.

Accordingly, there exists a need for semiconductor ceramic compositions suitable for use as heating elements and which possess good electrical and physical properties.

SUMMARY OF THE INVENTION

Accordingly, it is an object of this invention to provide semiconductor ceramic compositions having positive temperature characteristics which do not have the above disadvantages.

This and other objects of the present invention have been attained by providing semiconductor ceramic compositions having positive temperature characteristics which comprise 0.03 – 0.6 mole % of a semiconductor-forming component and barium titanate in which 1 – 40 mole % of barium is substituted with lead and 1 – 22 mole % of barium is substituted with calcium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

The present inventors have discovered semiconductor ceramic compositions which possess positive temperature characteristics but do not have the mentioned disadvantages. The inventors have discovered that mixtures of barium titanate, lead titanate and calcium titanate at particular ratios may be sintered to form solid solutions thereof. The resulting semiconductor ceramic composition does not have the abovementioned disadvantages but does have high density, durability, a remarkably improved high breakdown voltage (two or three times higher than that of the conventional one), improved ageing variation under load at high temperature and can withstand higher voltages.

The semiconductor ceramic compositions which have the positive temperature characteristics of the present invention comprise:

(1) 0.03 – 0.6 mole % of semiconductor-forming component and barium titanate in which 1 – 40 mole % of barium is substituted with lead and 1 – 22 mole % of barium is substituted with calcium;

(2) Preferably 0.06 – 0.9 wt. % of $SiO_2$ is added to the composition;

(3) It is also preferred to add 0.002 – 0.03 wt. % of Mn to the composition;

(4) Most preferably, 0.06 – 0.9 wt. % of $SiO_2$ and 0.002 – 0.03 wt. % of Mn are added to the composition.

The semiconductor-forming components can be compounds containing Nb, Ta, Bi, Sb, W or a rare earth element such as scandium, yttrium, lanthanum, cerium, praseodymium, neodymium, promethium, samarium, europium, gadolinium, terbium, dysprosium, holmium, erbium, thulium, ytterbium, and letucium. The solid solutions for the semiconductor ceramic compositions can be prepared by conventional methods, for example, the powdered components may be mixed and sintered. The powdered components can be barium titanate, lead titanate and calcium titanate or compounds which forming these titanates. The size of each powdered component can be selected as desired. The semiconductor-forming components can be also powdered compounds having said element and can be mixed with the primary powdered components in powder form before sintering.

The manganese additive is usually a manganese compound such as $MnNO_2$, $MnNO_3$, and the like. The silicon dioxide and manganese additives may be mixed with the powdered primary components before sintering.

Having generally described the invention, a more complete understanding can be obtained by reference to certain specific examples, which are included for purposes of illustration only and are not intended to be limiting unless otherwise specified.

EXAMPLE

Figure 1:
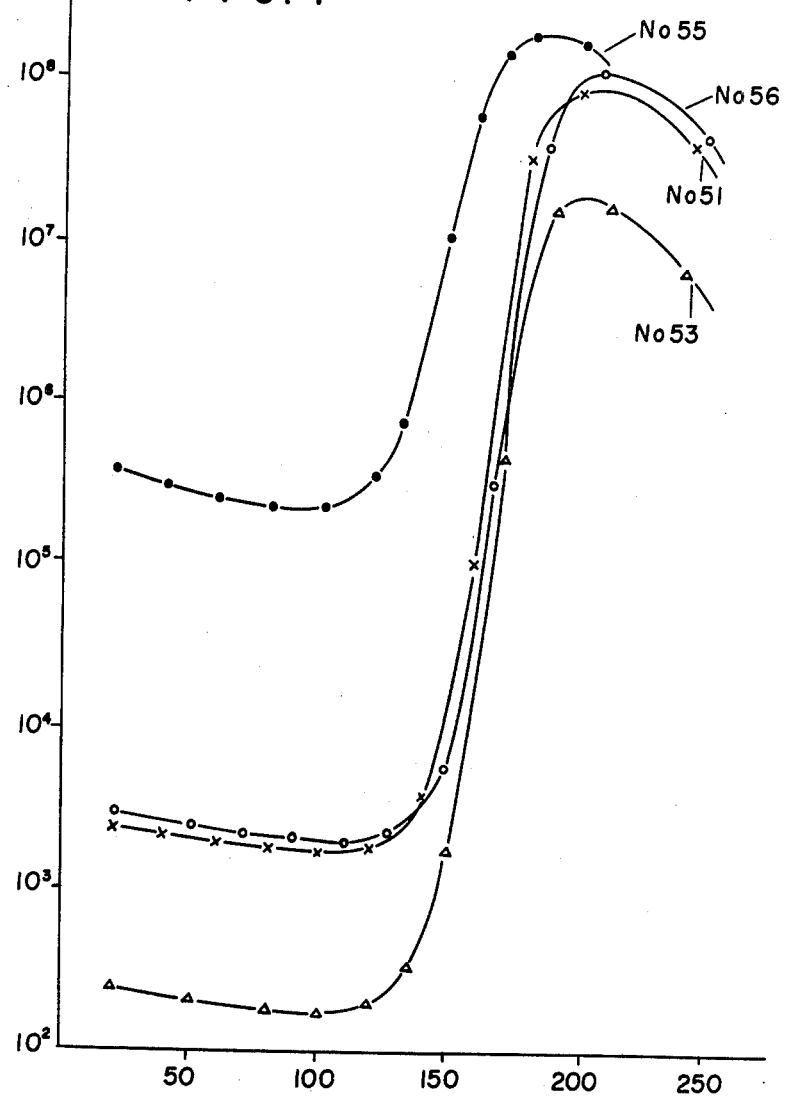
FIG. 1 is a graph of specific resistance versus temperature for four semiconductor ceramic compositions.

A series of samples were prepared as follows:
$BaCO_3$, $TiO_2$, $CaCO_3$, $PbO$, $Y_2O_3$, $SiO_2$ and $MnNO_3$ (in water) were used as the starting powdered materials to form the compositions stated in Table 1. The powdered materials were mixed in a wet condition for about 16 hours in a pot-mill made of polyethylene. The mixture was dehydrated, dried and calcined at 1000° – 1200° C for 0.5 – 3 hours. The calcined mixture was roughly crushed and then further crushed in a wet condition for about 20 hours in said pot-mill. The resulting crushed mixture was dehydrated and dried and then about 2 wt. % of polyvinyl alcohol was added to it as a binder and the mixture was crushed to form a powder having a size of 50 - 150 mesh. The mixture was molded under a hydraulic pressure of 1 – 3 ton/cm$^2$ in a mold to form a disc having a diameter of 16.5 mm and a thickness of 3.5 mm. The disc was sintered in a batch furnace at 1230° – 1330° C for 0.5 – 2 hours. An electrode was formed on both surfaces of the resulting sample by a nonelectrode plating of In - Ga alloy or Ni. The specific resistance of $f_{20}$, the breakdown voltage, $V_B$, in voltage-current characteristics and the temperature for resulting positive temperature characteristics, Tc, (Curie point) of each sample were measured. The results are shown in Table 1. The measurements were conducted at 20° C (room temperature), and the specific resistance was measured by using a Digital resistance tester TR-6834 manufactured by Takeda Riken K.K. applying DC voltage of less than 0.5 volt. The breakdown voltage tester was manufactured by TDK. The temperature characteristics of specific resistance was measured by using Digital resistance testers TR-6834 and TR-8651 manufactured by Takeda Riken K.K. in a bath of BT-10 manufactured by Yashima Seisakusho K.K. In Table 1, the sample Nos. 3 – 9; 11 – 20; 28 – 33; 35 – 39; 41 – 54 and 58 – 60 are compositions of the present invention. In these examples, an yttrium compound was used. The same results can be attained by substituting for the yttrium compound a compound having a rare earth element, Nb, Ta, Bi, Sb or W. FIG. 1 is a graph of specific resitance-temperature characteristics of the sample Nos. 51, 56, 53 and 55. Samples Nos. 51 and 56 had substantially the same resistance-temperature characteristics. Thus, it can be seen that sample No. 51 which is within the scope of the present invention had a breakdown voltage, $V_B$, of about twice that of sample No. 56. Samples Nos. 53 and 55 demonstrate that when the calcium content exceeds 22 mole % of the composition the specific resistance at room temperature is too high for the composition to be of practical use.

TABLE 1

| Sample No. | $(Ba_xPb_yCa_z)TiO_3$ | | | Additive | | | $\int 20$ [Ω-cm] | Tc [°C] | $V_B$ [V/mm] |
| | x [mole%] | y [mole%] | z [mole%] | S.C.F.C. [mole%] | $SiO_2$ [Wt.%] | Mn [wt.%] | | | |
| --- | --- | --- | --- | --- | --- | --- | --- | --- | --- |
| 1 | 94.0 | 6.0 | — | Y0.4 | — | — | 50 | 150 | 48 |
| 2 | 93.5 | " | 0.5 | " | " | " | 50 | 150 | 48 |
| 3* | 93.0 | " | 1.0 | " | " | " | 50 | 150 | 70 |
| 4* | 89.0 | " | 5.0 | " | " | " | 70 | 148 | 90 |
| 5* | 84.0 | " | 10.0 | " | " | " | 60 | 145 | 110 |
| 6* | 77.0 | " | 17.0 | " | " | " | 70 | 146 | 125 |
| 7* | 76.0 | " | 18.0 | " | " | " | 60 | 143 | 130 |
| 8* | 74.0 | " | 20.0 | " | " | " | 100 | 141 | 150 |
| 9* | 72.0 | " | 22.0 | " | " | " | 800 | 139 | 200 |
| 10 | 69.0 | " | 25.0 | " | " | " | $5.8 \times 10^4$ | 136 | 300 |
| 11* | 77.0 | 6.0 | 17.0 | Y0.4 | 0.06 | — | 61 | 146 | 150 |
| 12* | " | " | " | " | 0.10 | " | 65 | 145 | 190 |
| 13* | " | " | " | " | 0.50 | " | 73 | 147 | 210 |
| 14* | " | " | " | " | 0.70 | " | 84 | 146 | 220 |
| 15* | " | " | " | " | 0.90 | " | 82 | 146 | 200 |
| 16* | 80.0 | 5.0 | 15.0 | Y0.40 | — | 0.002 | 79 | 143 | 155 |
| 17* | " | " | " | " | " | 0.005 | 85 | 143 | 180 |
| 18* | " | " | " | Y0.42 | " | 0.010 | 150 | 142 | 200 |
| 19* | " | " | " | Y0.44 | " | 0.020 | 520 | 140 | 300 |
| 20* | " | " | " | Y0.46 | " | 0.030 | 2100 | 139 | >333 |
| 21 | 99.0 | 1.0 | — | Y0.4 | 0.6 | — | 40 | 132 | 50 |
| 22 | 94.0 | 6.0 | " | " | " | " | 40 | 150 | 50 |
| 23 | 90.0 | 10.0 | " | " | " | " | 40 | 170 | 53 |
| 24 | 80.0 | 20.0 | " | " | " | " | 60 | 210 | 60 |
| 25 | 70.0 | 30.0 | " | " | " | " | 85 | 260 | 67 |
| 26 | 60.0 | 40.0 | " | " | " | " | 150 | 300 | 84 |
| 27 | 50.0 | 50.0 | " | " | " | " | 300 | 334 | 84 |
| 28* | 93.0 | 6.0 | 1.0 | " | " | " | 40 | 149 | 65 |
| 29* | 89.0 | " | 5.0 | " | " | " | 62 | 147 | 110 |
| 30* | 84.0 | " | 10.0 | " | " | " | 54 | 145 | 130 |
| 31* | 77.0 | " | 17.0 | " | " | " | 53 | 142 | 135 |
| 32* | 74.0 | " | 20.0 | " | " | " | 92 | 141 | 165 |
| 33* | 72.0 | " | 22.0 | " | " | " | 780 | 139 | 200 |
| 34 | 69.0 | " | 25.0 | " | " | " | 62000 | 135 | >333 |
| 35* | 83.0 | 1.0 | 16.0 | " | " | " | 45 | 125 | 120 |
| 36* | 77.0 | 10.0 | 13.0 | " | " | " | 65 | 164 | 135 |
| 37* | 70.0 | 20.0 | 10.0 | " | " | " | 82 | 204 | 185 |
| 38* | 65.0 | 30.0 | 5.0 | " | " | " | 101 | 256 | 200 |
| 39* | 58.0 | 40.0 | 2.0 | " | " | " | 180 | 298 | 170 |
| 40 | 54.2 | 45.0 | 0.8 | " | " | " | 210 | 315 | 100 |
| 41* | 78.0 | 10.0 | 12.0 | Y0.4 | 0.06 | 0.02 | 3000 | 151 | >333 |
| 42* | " | " | " | " | 0.10 | " | 1000 | 149 | >333 |
| 43* | " | " | " | " | 0.40 | " | 500 | 150 | 300 |
| 44* | " | " | " | " | 0.90 | " | 35 | 147 | 220 |
| 45* | 82.0 | 6.0 | 12.0 | Y0.40 | 0.50 | 0.002 | 55 | 147 | 140 |
| 46* | " | " | " | " | " | 0.005 | 60 | 147 | 180 |
| 47* | " | " | " | " | " | 0.010 | 75 | 146 | 250 |
| 48* | " | " | " | Y0.42 | " | 0.020 | 170 | 140 | 300 |
| 49* | " | " | " | " | " | 0.025 | 280 | 140 | 333 |
| 50* | " | " | " | Y0.43 | " | 0.030 | 350 | 139 | >333 |
| 51* | 89.0 | 6.0 | 5.0 | Y0.4 | 0.6 | 0.02 | 2500 | 140 | 300 |
| 52* | 84.0 | " | 10.0 | " | " | " | 680 | 138 | 300 |
| 53* | 79.0 | " | 15.0 | " | " | " | 250 | 135 | 333 |

TABLE 1-continued

| Sample No. | (Ba$_x$Pb$_y$Ca$_z$)TiO$_3$ x [mole%] | y [mole%] | z [mole%] | Additive S.C.F.C. [mole%] | SiO$_2$ [Wt.%] | Mn [wt.%] | ∫20 [Ω-cm] | Tc [° C] | V$_B$ [V/mm] |
| --- | --- | --- | --- | --- | --- | --- | --- | --- | --- |
| 54* | 74.0 | " | 20.0 | " | " | ' | 2200 | 131 | >333 |
| 55 | 71.0 | " | 23.0 | " | " | " | 4.0×10$^5$ | 126 | >333 |
| 56 | 94.0 | 6.0 | — | Y0.4 | 0.6 | 0.02 | 3000 | 143 | 165 |
| 57 | 97.0 | 3.0 | — | Y0.65 | 0.6 | 0.03 | 2000 | 131 | 210 |
| 58* | 73.0 | 8.0 | 19.0 | Y0.45 | 0.6 | 0.022 | 1500 | 130 | >333 |
| $^1$59* | 82.0 | 6.0 | 12.0 | Y0.40 | 0.4 | 0.02 | 780 | 136 | 333 |
| $^2$60* | 82.0 | 6.0 | 12.0 | Y0.40 | 0.4 | 0.02 | 1300 | 135 | 333 |

Note:
S.C.F.C.: semiconductor-forming component
1. 59 .......Ti = 1.01,
2. 60 .......Ti = 1.02
*according to the present invention The reasons for the limitations on the components of the semiconductor ceramic composition will be illustrated.

When the lead content is more than 40 mole % of the composition, a solid solution for the calcium component is not formed and the capability of the composition to withstand higher voltages is not improved. However, when the lead content is less than 1 mole % of the composition, the curie temperature, Tc, is not increased above 120° C, the electrical characteristics are not improved and the composition is of no practical use.

If the calcium content is more than 22 mole % of the composition, the solid solution of the calcium component is not formed whereby the specific resistance at room temperature is too high and it is not suitable for practical use. On the other hand, when the calcium content is less than 1 mole % of the composition, the capability of the composition to withstand higher voltages is not improved and it is difficult to prepare a ceramic having high density by sintering.

When the content of the semiconductor-forming component in the composition is more than 0.6 mole % based on the barium titanate substituted with lead and calcium, the semiconductor ceramic composition is an insulator and does not possess the semiconductive property. However, when the content of the semiconductor-forming component in the composition is less than 0.03 mole %, no effect is found and no semiconductive property results.

If the content of SiO$_2$ in the composition is more than 0.9 wt. % it is difficult to prepare a ceramic having high density and the capability of the composition to withstand higher voltages is not as improved as when less than 0.9 wt. % of SiO$_2$ is added. On the other hand, if the content of SiO$_2$ in the composition is less than 0.6 wt. %, the capability of the composition to withstand higher voltages is not improved as much as is desired and the range of the sintering temperature is narrow.

When the current of Mn in the composition is more than 0.03 wt. %, the specific resistance of the composition at room temperature is too high for practical use. However, if the content of Mn in the composition is less than 0.002 wt. %, the improvement in the specific resistance-temperature characteristics is not as great as that desired.

Figure 2:
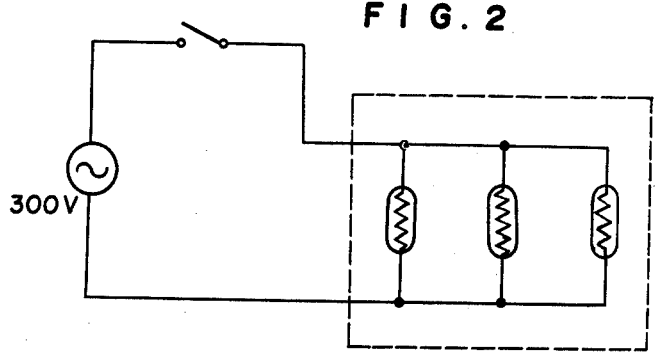
FIG. 2 is the circuit diagram employed to measure the variation in aging characteristics of semiconductor ceramic compositions.

As stated previously, the semiconductor ceramic compositions of the present invention have about 2 – 3 times the breakdown voltage of the conventional compositions having the same Curie temperature and the same specific resistance at room temperature. The compositions of the present invention are semiconductor elements having positive temperature characteristics and high reliability. The variations of the resistance with ageing for the sample Nos. 41 and 56 – 58 of Table 1 were measured in the circuit of FIG. 2. In the test, 300 volts AC was applied to the samples at 85° C for 30 hours and then the samples were kept at 20° C for 1 hour, and then resistances of the samples were measured. The resistance variation percentages were calculated from the initial resistances R$_1$ and the resistances R$_2$ after treatment.

$$\Delta R = \frac{R_2 - R_1}{R_1} \times 100 \ (\%)$$

The resistance variation characteristics are:

TABLE 2

| Sample No. | ∫20 (Ω-cm) | Tc (° C) | V$_B$(V/mm) | Ageing (%) |
| --- | --- | --- | --- | --- |
| 41 | 3000 | 151 | >333 | −2.2 |
| 56 | 3000 | 143 | 165 | −30.0 |
| 57 | 2000 | 131 | 210 | −80.0 |
| 58 | 1500 | 130 | >333 | −2.0 |

The present invention provides semiconductor ceramic compositions which comprise a semiconductor-forming component and titanate of barium, lead and calcium. The semiconductor ceramic compositions of this invention have high density, are stable, are capable of withstanding remarkably higher voltages and have 2 – 3 times the breakdown voltage compared with the conventional compositions which have the same specific resistance at room temperature and the same curie temperature. Further, the composition of the present invention has improved ageing variation under load at high temperature which means these compositions have a greater degree of reliability. The semiconductor ceramic compositions are especially useful as semiconductor elements used at high temperatures such as heating elements.

Having now fully described the invention, it will be apparent to one of ordinary skill in the art that many changes and modifications can be made thereto without departing from the spirit or scope of the invention as set forth herein.

What is claimed as new and desired to be secured by U.S. Letters Patent is:

1. A semiconductor ceramic composition having positive temperature characteristics, which comprises:
   (a) titanates of barium, lead and calcium which have 1 – 40 mole % of lead titanate, 1 – 22 mole % of calcium titanate and 38 – 98 mole % of barium titanate, wherein said contents of barium, lead and calcium titanates are based on 100 mole % of titanate present in said composition; and (b) 0.03 – 0.6 mole % of a semiconductor forming component of a metal derived from the metal oxides selected from the group consisting of Nb, Ta, Bi, Sb, W, and the rare earth element oxides.

2. The semiconductor ceramic composition of claim 1 which further comprises 0.06 – 0.9 wt. % of $SiO_2$.

3. The semiconductor ceramic composition of claim 1 which further comprises 0.002 – 0.03 wt. % of Mn.

4. The semiconductor ceramic composition of claim 1 which further comprises 0.06 – 0.9 wt. % of $SiO_2$ and 0.002 – 0.03 wt. % of Mn.

5. The semiconductor ceramic composition of claim 1, which is produced by mixing sources of barium titanate, lead titanate, calcium titanate and said semiconductor-forming component of a metal selected from the group consisting of Nb, Ta, Bi, Sb, W and the rare earth elements, wherein said source of said semiconductor-forming component is an oxide or a compound of said metal convertible to an oxide, calcining the mixture at a temperature of 1000° – 1200° C, crushing, molding and then sintering said mixture at a temperature of 1230° – 1330° C.

6. The semiconductor ceramic composition of claim 1, wherein the semiconductor-forming component is an oxide of yttrium, niobium, tantalum, bismuth, antimony or tungsten.

7. The semiconductor ceramic composition of claim 6, wherein the semiconductor-forming component is yttrium oxide.

* * * * *